July 20, 1965     N. J. RYSKAMP     3,195,689

MECHANICAL TYPE AUTOMATIC BRAKE ADJUSTER

Filed May 31, 1963

Inventor
Neil J. Ryskamp
By Charles L. Schuck
Attorney

United States Patent Office 3,195,689
Patented July 20, 1965

3,195,689
MECHANICAL TYPE AUTOMATIC BRAKE
ADJUSTER
Neil J. Ryskamp, Markham, Ill., assignor to Allis-Chalmers Manufacturing Company, Milwaukee, Wis.
Filed May 31, 1963, Ser. No. 284,587
6 Claims. (Cl. 188—79.5)

This invention relates to an automatic wear compensating device for a brake.

It has long been recognized that a reliable, inexpensive automatic brake adjuster for compensating for lining wear is desirable. In using such a device in trucks for instance, the same amount of pedal travel will apply the brakes throughout the wear life of the brake lining. Many brake adjusters have heretofore been proposed and used but they have not proven entirely satisfactory. Some prior art devices are excessively expensive, some are so intricate that the presence of foreign material tends to result in malfunction and others are not reliable in operation.

It is a main object of this invention to provide an inexpensive and reliable automatic brake adjuster which serves to maintain a constant clearance between the brake shoe and the brake drum, in the nonengaging position, throughout the wear life of the brake lining.

It is a further object of this invention to provide an automatic brake adjuster of the type hereinbefore mentioned which uses frictional engagement between metallic and nonmetallic parts and is particularly suited for use with floating brake shoes.

Other objects and advantages of this invention will become apparent when the following description is read in conjunction with the drawings in which.

Figure 1:
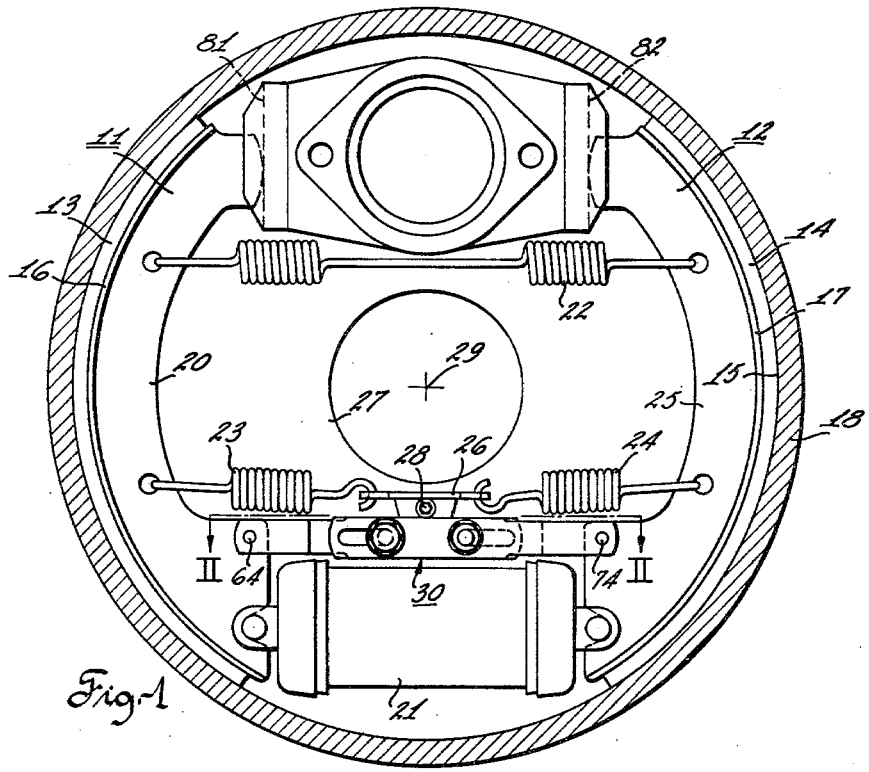
FIG. 1 is a front elevation view of a brake drum and shoe assembly illustrating an automatic brake adjusting mechanism of this invention.

Referring to FIG. 1, a pair of floatingly mounted semicircular shoes 11, 12 is shown in an engaged condition, wherein the linings 13, 14 bonded to the cylindrical portions 16, 17 are in engagement with the inner cylindrical face 15 of the brake drum 18. The brake shoes 11, 12 are moved away from one another to their braking position, illustrated, by actuating means including a hydraulic cylinder 21 of conventional construction. The cylinder may be supplied fluid by a master cylinder, not shown, which in turn is operated by a foot pedal, not shown. The illustrated brake drum and shoe assembly, although suitable for use in stopping rotation between various relatively rotatable structures, is particularly suitable for use in braking a vehicle wheel.

Figure 2:
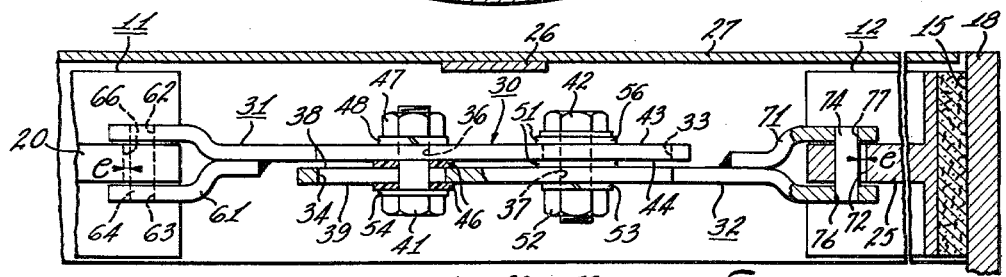
FIG. 2 is a view taken along the lines II—II of FIG. 1.

Referring also to FIG. 2, the wheel cylinder 21 has moved the brake shoes outwardly against the tension of the upper shoe return spring 22 and a pair of lower shoe return springs 23, 24. Springs 23, 24 have their outer ends connected to the ribs 20, 25 of brake shoes 11, 12 and have their inner ends connected to a bracket 26 which in turn is secured to an anchoring plate 27 by cap screw 28. The anchoring plate 27 may be secured to a stationary axle housing and the drum 18 may be secured to a wheel for rotation about axis 29 which is also the axis of cylindrical face 15.

My automatic brake adjuster mechanism 30 includes a pair of identical juxtaposed slide members 31, 32 having walls defining elongated slots 33, 34, respectively. The slots 33, 34 are in transverse relation to friction surfaces 38, 39, 43, 44, the latter being parallel and extending in the direction of movement of the shoe during braking. The slots 33, 34 also extend in the same direction. The major portion of each of the guide members 31, 32 is of uniform thickness and is noncorrosive. Steel plated with zinc and then treated with a chromate dip, to retard formation of zinc oxide, provides slide members 30, 32 which are corrosion resistant so that the coefficient of friction of the slide surfaces 38, 39, 43, 44 remains the same or within a suitable predetermined range throughout their useful life. A pair of nylon washers 46 is disposed on opposite sides of slide member 32 and a bolt 41 extends through bore 36 of member 31, through washers 46 and through slot 34 thereby holding the guide members and washers in proper alignment. The washers 46 may be made of other suitable nonmetallic material having a suitable coefficient of friction and which is stable under the conditions and environment to which brakes may be subjected during the useful life of the machine on which used. The nylon washers 46 have flat faces held against surfaces 38, 39 on opposite sides of slide member 32 at a predetermined force by a nut 47 on bolt 41 through lock washer 48. Likewise, a pair of nylon washers 51 is installed on opposite sides of slide member 31 and are held in position by a bolt 42 extending through hole 37 and slot 33. The flat faces of the washers 51 are held against the surfaces 43, 44 at a proper pressure by a nut 52 and a lock washer 53. Thus bolts 41, 42 serve as tension members and each set of bolt, nut and lock washers serves as an adjustable fastening means. Washers 54, 56 are installed under the heads of the bolts 41, 42 to effect even distribution of force against the adjacent friction washers 46, 51, respectively.

Slide member 31 has a yoke portion 61 at its outer end presenting a pair of holes 62, 63 in which a pin 64 is pressed to provide a pivotal connection of slide member 31 on the brake shoe 11. The hole 66 in rib 20, through which pin 64 extends, is of larger diameter than pin 64 by dimension $e$, thus providing a lost motion connection. The yoke portion 71 of slide member 32, as illustrated in partial cross section in FIG. 2 has a pin 74 press fit in holes 76, 77 and the pin extends through a hole 72 formed in the rib 25 which is of greater diameter than the pin 74 by dimension $e$.

Figure 3:
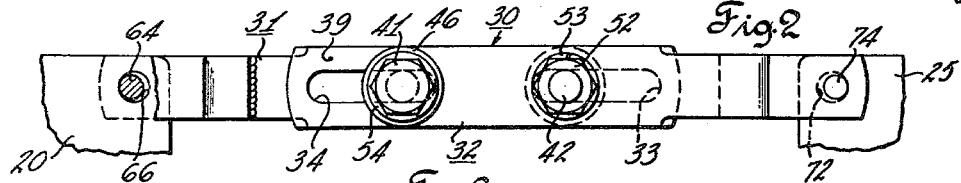
FIG. 3 is an enlarged view of the automatic brake adjusting mechanism shown in FIGS. 1 and 2.

In the condition illustrated in FIGS. 1 and 2, the brake has been applied by expansion of the conventional wheel cylinder 21. The force exerted by cylinder 21 is sufficient to adjust the length of the automatic brake adjusting mechanism 30 and effect braking. The wheel cylinder upon expansion will move the brake shoes outwardly into engagement with drum face 15. In so doing the position of pins 64, 74 in holes 66, 72 will change from that shown in FIG. 3 to that shown in FIG. 2. As the brake lining wears, the actuator, through its operating the brake shoes, will move the slide members 31, 32 longitudinally relative to one another thereby causing the washers 46, 51 to slide relative to the friction surfaces 38, 39, 43, 44 of the slide members 31, 32. Upon releasing the brake, the wheel cylinder will retract and the return springs 23, 24 will move the brake shoes 11, 12 inwardly toward one another to a condition wherein the pins 64, 74 will abut the opposite sides of the holes 66, 72 as illustrated in FIG. 3. The brake shoes are always backed away from the drum 18 the same distance upon retraction since the brake adjuster is lengthened, if necessary to compensate for wear, upon each brake application.

The force exerted by the return springs 23, 24 is not sufficient to overcome the skid resistance effected by engagement of the washers 46, 51 against surfaces 38, 39, 43, 44. Since the brake shoes are retracted the same distance each time, the distance being determined by the difference $e$ in the diameters of pins 64, 74 and holes 66, 72, the same amount of brake pedal travel will effect engagement of the brakes throughout the life of the brake lining. At the time the lining is renewed, the adjuster may be shortened by use of an appropriate tool without loosening or removing the bolts 41, 42 and thus the predetermined force on the washers 46, 51 will be retained and the adjuster mechanism is readily usable in the relined brake assembly.

Figure 4:
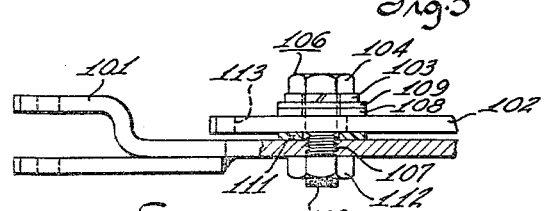
FIG. 4 is a view of an alternate slide fastening means for my brake adjuster.

Referring to FIG. 4, an alternate fastening means 100 for a pair of slide members 101, 102 is shown. In the FIG. 4 construction, the lock washer 103 is placed under the head 104 of the bolt 106 and the bolt has a threaded portion in threaded engagement with internal threads 107 of a drilled and tapped hole in slide member 101, the hole being in registration with slot 113. The bolt 106 is threaded into threads 107 until the proper pressure is exerted against the nonmetallic function washer 108 through flat washer 109 and lock washer 103. Lock washer 103 is preferably not flattened in its installed condition so that it can most effectively act as a resilient biasing means to maintain a uniform predetermined tension in bolt 106 and hence a constant predetermined pressure on the nonmetallic friction washers 108, 111. The jam nut 112, upon its being tightened, jams the threads of the bolt against internal threads 107 thus fixedly holding or locking the fastening means 100. Use of an internally threaded hole in slide member 101 and the jam nut 112 permits the lock washer 103 to serve only as a tensioning or biasing element.

My brake adjusting mechanism is particularly suitable for use in a brake arrangement wherein the brake shoes are of the floating type illustrated. In the illustrated floating brake shoe mounting, the upper ends of the brake shoes 11, 12 slidingly fit in vertical slots 81, 82, thus permitting upward adjustment of the shoes as wear occurs to obtain full contact between the shoe and the drum face 15. The extensible adjuster mechanism 30 is connected only to the brake shoes 11, 12 and thus floats with the brake shoes 11, 12 in operation. Two lower shoe return springs 23, 24 are used to insure withdrawal of both brake shoes 11, 12 from the brake drum face 15 to their nonengaging or retracted position.

From the foregoing description it is evident that my automatic brake adjuster is inexpensive, reliable and readily adapted for use with automotive type brake shoes. The slide members may be identical in shape and are interchangeable, thus minimizing manufacturing cost. Also stocking of parts is simplified not only by virtue of the interchangeability of parts but also by virtue of the same size adjusted being usable in different size brake assemblies.

The embodiments of the invention in which an exclusive property or privilege is claimed are defined as follows:

1. An automatic adjuster for a brake of the type having a pair of floatingly mounted semicircular brake shoes adapted to be moved away from one another in one direction into frictional engagement with a brake drum, said adjuster comprising: first and second elongated slide members having adjacent end portions in juxtaposed relation to one another and remote end portions adapted for pivotal connection with said shoes, respectively, with lost motion in said one direction, a pair of parallel friction surfaces formed on opposite sides of one of said slide members and extending in said one direction, walls transverse to said surfaces defining a slot in said one slide member in interrupting relation to said surfaces, said slot being elongated in said one direction, a pair of nonmetallic friction washers having flat faces in frictional engagement with said surfaces, respectively, and fastening means holding said washers in frictional engagement with said surfaces including a tension member mounted on said other slide member for movement therewith and extending through said washers and slot.

2. The structure set forth in claim 1 and further comprising a pair of parallel friction surfaces formed on opposite sides of the other of said slide members in parallel relation to said one direction, walls defining a slot extending through said other slide member transversely to the friction surfaces thereon, said slot being elongated in said one direction, a pair of nonmetallic friction washers having flat faces in frictional engagement with said surfaces on said other slide member and fastening means holding said washers in frictional engagement with said surfaces including a tension member mounted on said one slide member and extending through said last mentioned pair of friction washers and through said slot in said other slide member.

3. An automatic wear compensating device for a brake employed between a pair of relatively rotatable structures of the type having a pair of semicircular shoes movable away from one another in one direction into engagement with the inner cylindrical face of a drum secured to one of said structures and actuating means interposed between said shoes for separating the latter in said one direction, said device comprising: an extensible adjuster mechanism including a pair of slide members extending in said one direction and disposed in adjacent relation to said actuating means, fastening means pivotally connecting one end of one of said slide members to one of said shoes, fastening means pivotally connecting one end of the other of said slide members to the other of said shoes, one of said fastening means providing a predetermined amount of lost motion in said one direction, parallel friction surfaces formed on opposite sides of said one of said slide members on planes parallel to said one direction, a pair of nonmetallic friction washers having flat faces in frictional engagement with said surfaces, respectively, walls in said one slide member defining a slot elongated in said one direction and extending through said one slide member in a direction transverse to said surfaces thereon, and fastening means holding said washers in frictional engagement with said surfaces including a tension member connected to said other slide member for movement therewith and extending through said washers and slot, said tension member being independent of said structures, shoes and actuating means.

4. The structure set forth in claim 3 and further comprising a pair of parallel friction surfaces formed on opposite sides of the other of said slide members on planes parallel to said one direction, walls in said other slide member defining a slot elongated in said one direction and extending through said other slide member in a direction transverse to said surfaces thereon, a pair of nonmetallic friction washers having flat faces in frictional engagement with said surfaces on said other slide member and fastening means holding said washers in frictional engagement with said surfaces including a tension member connected to said one slide member and extending through said last mentioned pair of friction washers and through said slot in said other slide member.

5. In a brake assembly between a pair of relatively rotatable structures and of the type having floatingly mounted brake shoes which are movable outwardly away from one another into engagement with a brake drum on one of said structures, the combination comprising: a brake adjuster having a pair of relatively extensible and retractable members, pivot connections securing the outer ends of said members to said shoes, respectively, independently of the other of said structures, one of said pivotal connections permitting a predetermined lost motion between one of said shoes and the member connected thereto, a friction element interposed between and in frictional engagement with said members, and fastening means independent of said structures holding said members in frictional engagement with said friction element including a tension member connected with one of said members and a pair of return springs having their inner ends connected to said other structure and their outer ends connected to said shoes, respectively, said springs lying in close proximity to said adjuster and being incapable of retracting the latter.

6. An automatic adjuster for a brake of the type having a pair of floatingly mounted semicircular brake shoes adapted to be moved away from one another in one direction into frictional engagement with a brake drum, said adjuster comprising: first and second elongated slide members having end portions adapted for pivotal connection with said shoes, respectively, with lost motion in said one direction, a pair of parallel friction surfaces formed on opposite sides of one of said slide members and extending in said one direction, walls transverse to said surfaces defining a slot in said one slide member in interrupting relation to said surfaces, said slot being elongated in said one direction, a threaded opening in the other of said slide members in registering relation to said slot, a pair of nonmetallic friction washers having flat faces in frictional engagement with said surfaces, respectively, and fastening means holding said washers in frictional engagement with said surfaces including a tension member extending through said washers and slot and having a threaded portion in threaded engagement with said threaded opening and a biasing element operatively interposed between said tension member and one of said friction members for exerting thrust thereagainst in a direction transverse to said surfaces.

References Cited by the Examiner

UNITED STATES PATENTS

| | | | |
|---|---|---|---|
| 2,241,479 | 5/41 | Rush | 188—79.5 |
| 2,286,711 | 6/42 | Buffington | 188—79.5 |
| 2,463,092 | 3/49 | Ensinger et al. | 188—79.5 |
| 2,875,860 | 3/59 | Eckardt et al. | 188—79.5 |
| 2,961,075 | 11/60 | Farhi | 188—79.5 |

FOREIGN PATENTS 449,527   6/49   Italy.

ARTHUR L. LA POINT, *Primary Examiner.*
DUANE A. REGER, *Examiner.*